Figure 1:
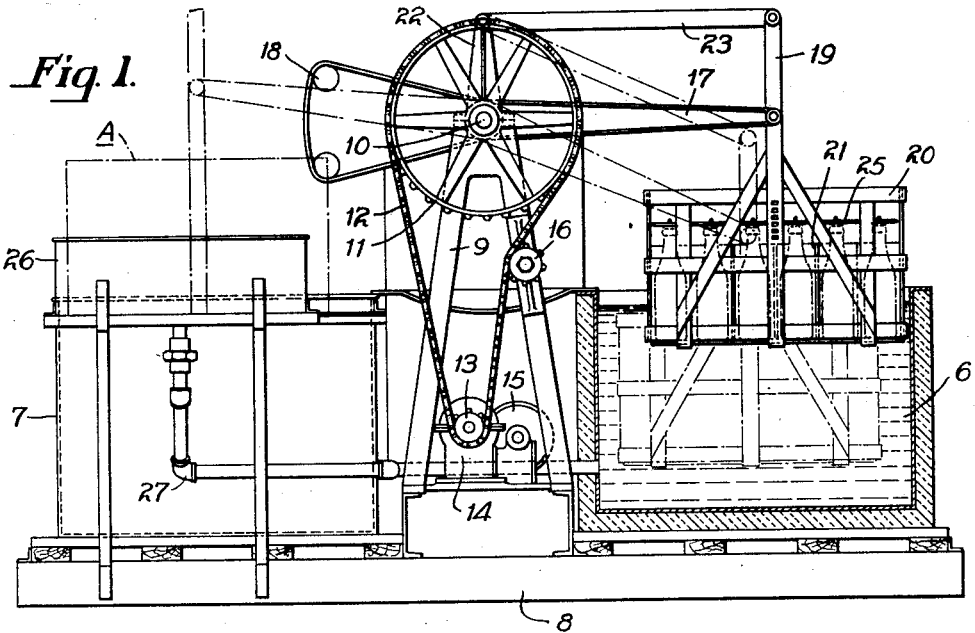

July 25, 1939.　　　　F. W. PRESTON　　　　2,167,185
BOTTLE TESTING APPARATUS
Filed Jan. 6, 1938　　　2 Sheets-Sheet 1

INVENTOR
Frank W. Preston,
By Archworth Martin,
Attorney.

July 25, 1939.  F. W. PRESTON  2,167,185
BOTTLE TESTING APPARATUS
Filed Jan. 6, 1938  2 Sheets-Sheet 2
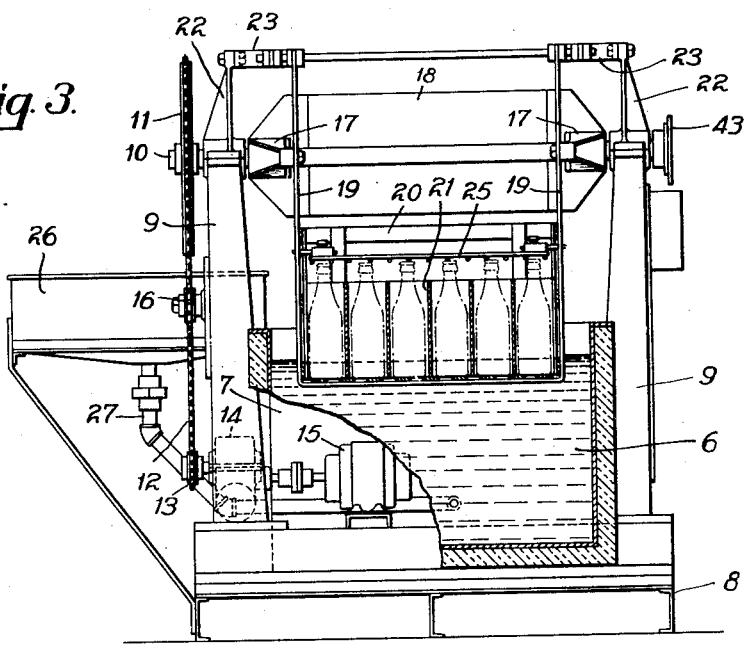
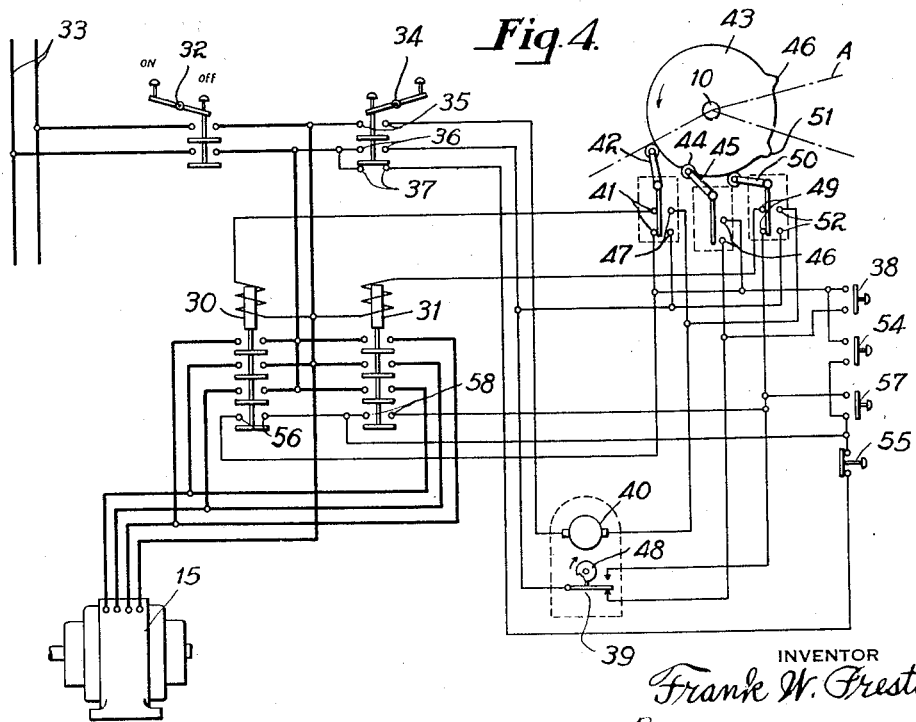
INVENTOR
Frank W. Preston,
By Archworth Martin,
Attorney.

Patented July 25, 1939

2,167,185

UNITED STATES PATENT OFFICE 2,167,185

BOTTLE TESTING APPARATUS

Frank W. Preston, Butler, Pa.

Application January 6, 1938, Serial No. 183,637

7 Claims. (Cl. 73—51)

My invention relates to the testing of glass bottles and the like under thermal shock, by subjecting the articles first to a bath at one temperature and then to a bath of a widely different temperature.

It is common knowledge that while glass is a relatively hard and strong material, it is brittle against blows or pressure of hard objects and against sudden changes of temperature, in particular perhaps against sudden reductions of its surface temperature. Thus most glass objects, unless very thin or of special glass compositions, will crack if heated in boiling water and then suddenly "quenched" in cold water. Again, many glass objects, particularly bottles, are apt in practice to be put from a warm room into ice boxes or ice water.

It is, therefore, customary in many manufacturing plants to test bottles by heating them in hot water and plunging them in cold. The hot water is usually under the boiling point, and the cold water is not usually ice water, but an accurate differential between the two is used, and the absolute temperatures of each bath do not vary greatly.

As ordinarily carried out, a small number of bottles (perhaps half a dozen) is put into a little basket, and placed by hand first in the hot bath and then in the cold. Sometimes a larger number are put in a larger basket, cage, or box, and lifted from one tank of water to the other with a hoist.

The conditions of the test are, however, not sufficiently standardized. The duration of time in the hot bath affects the temperature that the glass actually reaches, the time that elapses between emergence from the hot bath and immersion in the cold bath affects the skin temperature of the bottle and is quite important (the time is usually less with half a dozen bottles in a hand basket than with a dozen or a hundred in a mechanical hoist), and the amount of stirring or moving around of the bottle in the cold bath affects the severity of the chilling. Thus the breakage of bottles may differ from causes other than the quality of the glass itself.

It is the purpose of the present invention to provide means for carrying out this test in a more completely controlled manner than usual, eliminating many of the variables; to do it with a minimum of effort and fatigue on the part of the operator; to operate on a larger number of bottles than is customary, in order to get more accurate and dependable "sampling", and also to increase the precision and reliability of such tests.

Figure 2:
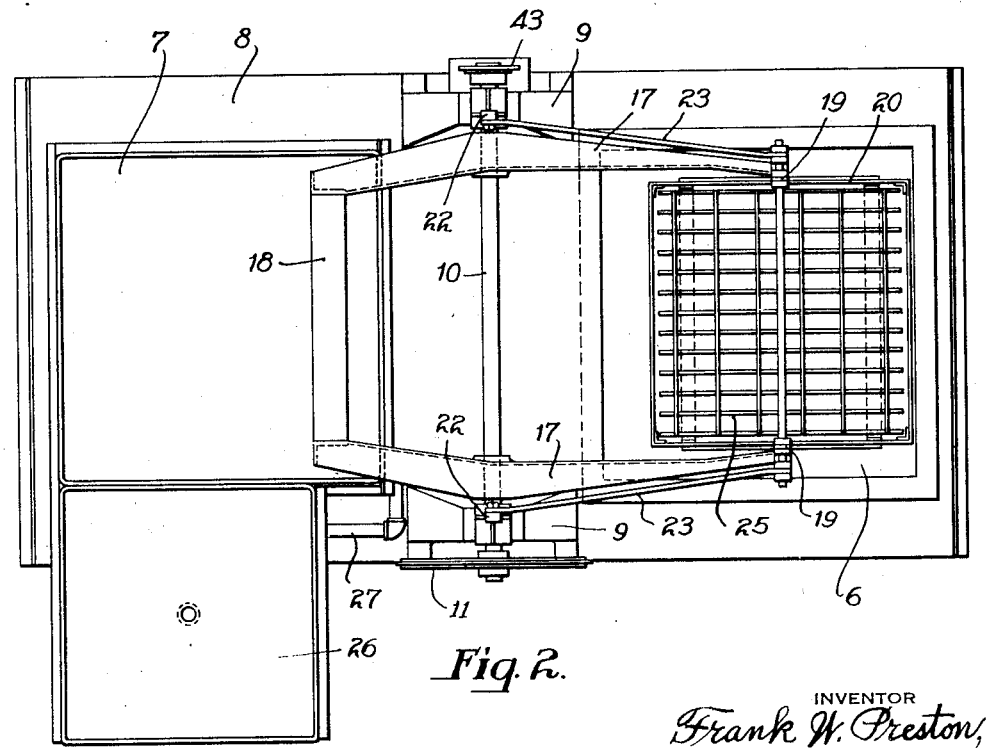

As shown in the accompanying drawings, Figure 1 is a side elevation of the apparatus partly in section; Fig. 2 is a plan view thereof; Fig. 3 is an end view partly in section, and Fig. 4 is a diagrammatic view illustrating the wiring diagram for the electrical driving and control apparatus.

The apparatus includes a hot water tank 6 and a cold water tank 7 mounted upon a suitable base or foundation 8. The water in the tank 6 can be heated through direct application of heat to the tank, or hot water can be circulated therethrough from any conventional source of heating. Between the tanks are mounted upright frame members 9, provided at their upper ends with bearings in which is journalled a shaft 10, which carries a sprocket wheel 11 that through a chain 12, is driven from a sprocket 13 which through speed reducer 14, is driven by an electric motor 15. A tightener sprocket 16 for the chain 12 is adjustably mounted upon one of the uprights 9.

A pair of arms 17 having counterbalancing weighted ends 18 are secured to the shaft 10 and at their outer ends have pivotal connection with vertical levers 19, that support an openwork frame or basket 20 for receiving the bottles to be tested. Removable separating devices or separators 21 are placed within the basket 20, they being removable to put in different sizes of spacing elements for large and small bottles.

Rigidly secured to the upper ends of the uprights 9 are posts 22 with which links 23 have pivotal connection at their inner ends, the outer ends of such links being pivotally connected to the upper ends of levers 19. By the link and lever arrangement just described, the basket 20 is always maintained in an upright position when it is being swung by the arms 17 from one tank to the other.

The basket is loaded with bottles at station A (Fig. 1), and a grid 25 placed upon the tops of the bottles and latched to the basket for holding the bottles against floating when they are immersed in the hot water tank. The motor 15 is then set into operation to move the basket into the hot water tank 6 to a point where the bottles will be completely immersed and become filled with water, where it may be permitted to remain for perhaps five minutes, depending upon the wall thickness and size of the bottles. Thereupon the motor is driven in the opposite direction, as hereinafter described, to swing the basket across and into the cold water tank where they will remain for perhaps 30 seconds, the transfer movement being made in a definite period of time and requiring not more than perhaps 15 seconds. Thereupon the motor is again set into motion to lift the rack to the loading and unloading station A. The grid 25 is removed, the bottles taken out by the operator and the water emptied therefrom upon a drain board 26, from which the water will flow through a pipe 27 into the hot water tank.

The periods of time above mentioned may be varied as conditions may require, but for given conditions those periods are maintained constant in order that there will be uniformity of testing conditions. However, the time intervals will be such that, in the hot bath, the bottles will come pretty close to thermal equilibrium, and in the cold bath, the defective bottles will have ample time to break under the thermal shock. The interval required to transfer the bottles from the hot water tank to the cold water tank will be such an interval as will not permit the bottles to get appreciably colder, and, at the same time, will not be so short as to require violent action that may rattle the bottles around too vigorously or create too much of a surge of water when they hit the cold tank. The bottles are filled with the hot water when in the tank 6, and since the basket does not swing when in the tanks, the degree of agitation of the water does not vary substantially as between successive groups of bottles, therefore tending still further toward uniformity of test.

Upon starting of the motor from the loading station A with the basket containing bottles to be tested, the movements of the cage or carrier are selectively either manually or automatically effected until the basket is again returned to the loading and unloading station A, by electrical apparatus which will now be described.

Referring now to Fig. 4, I provide motor-controlling, reversing switches 30 and 31. A line switch 32 is manually actuated which will electrically connect the control apparatus with an electrical energy supply line 33. To effect automatic operation of the carrier through a complete cycle, a manual-automatic switch 34 is operated to close the normally open contacts 35 and 36 and to open the normally closed contacts 37. A starting switch 38 is then depressed, which completes a circuit extending from one side of line 33 through the switch 32, contacts 36 of the switch 34, normally closed switch member 39 and its back contact of a timing device 40, the switch 38, normally closed contacts 41 of a limit switch 42 to the operating coil of the motor switch 30 and thence to the other side of the line. The switch 30 is thereby energized and supplies current to the motor in such a direction that it will cause the carrier to travel from the loading station A toward the hot water tank 6. As this movement is initiated, a cam 43 fixed to the shaft 10 moves a detent portion 44 from beneath the roller of a limit switch 45, whereby this switch closes its normally open contacts 46 and establishes a holding circuit for the motor switch 30, which holding circuit is in parallel with the above-traced starting circuit extending through the push-button switch 38.

As the carrier approaches a point adjacent to its lowered position in the hot water tank 6, a cam lobe 46 on the cam actuates the limit switch 42 and opens the holding circuit for the motor switch 30 at the normally closed contacts 41, and switch 30 de-energizes and opens the motor circuit. Actuation of the limit switch 42 also closes the circuit for the timing device 40 at contacts 47. Preferably this timing device is a motor-driven timer of well-known form having a cam 48 which, after a predetermined length of time, permits the member 39 to be actuated and open the heretofore traced circuit through its normally closed back contact.

When actuated, the member 39 completes a circuit through its front contact which extends through normally closed contacts 49 of a limit switch 50 and through the operating coil of the motor switch 31. The relay 31 is thus energized and reverses the flow of current to the motor 15 and thereby reverses the direction of rotation thereof. The carrier is thus caused to move from the hot water tank and into the cold water tank. As it approaches its lowered position in the cold water tank, a cam lobe 51 operates the limit switch 50 and breaks the circuit for the motor switch 31, which de-energizes and opens the motor circuit, thereby causing the carrier to come to rest. At the same time, the limit switch 50 completes a circuit through its normally open contacts 52, again operating the timing device 40. After a predetermined time interval, which timing period will be of course relatively short as compared with the timing period required for the immersion of the bottles in the hot water tank, the cam 48 causes the member 39 to be moved into contact with its back contact. This results in again completing the circuit for the motor switch 30 through the contacts 46 of the limit switch 45. The carrier is thereby moved toward the loading and unloading station A. When it reaches the station, the detent 44 of the cam 43 permits the limit switch 45 to open the circuit of the switch 30 at the contacts 46, thereby bringing the carrier to rest at the completion of the cycle of movements.

In cases where it is desired to have the carrier immersed in the baths for different periods than that for which the timing switch 40 is set, I provide a manual control for operating the motor 15. To effect manual operation, the switch 34 is operated to open the contacts 35 and 36, and to close the contacts 37. With the carrier in the loading position A, a push-button switch 54 is manually closed to complete a circuit for energizing the motor switch 30, which circuit extends through the contacts 37 of the switch 34, through a normally closed reset switch 55, switch 54 and past the normally closed contacts 41 of the limit switch 42 to the operating coil of the switch 30. The motor is thereby energized and causes the carrier to move to the hot water tank, and it is brought to rest when the limit switch 42 is actuated, as heretofore described. As the carrier begins to move, a holding circuit is completed for the relay switch 30, which extends from reset switch 55 through contacts 56 of the relay 30 which are closed when the relay is energized, thus establishing a circuit in parallel with the original energizing circuit extending through the push-button switch 54, so that the switch 54 may be released after the motor has been started.

By the operation of the limit switch 42, the holding circuit for the switch 30 is opened at contact 41 and switch 30 de-energizes. The carrier can remain in the hot water tank for as long a period as desired. To effect traveling movement of the carrier to the cold water tank, a push-button switch 57 is manually closed, which completes the energizing circuit for the motor switch 31, which circuit extends through the normally closed contacts 49 of the limit switch 50. Upon energization of the switch 31, the motor is caused to operate in the reverse direction, and at contacts 58 of this switch a holding circuit is completed which maintains the switch energized independently of the push-button switch 51, until the carrier has moved to the cold water tank and the cam lobe 51 actuates the limit switch 50. When it is desired to cause the carrier to be moved out of the cold water tank and returned to the loading station A, the push-button switch 54 is again depressed manually and the switch 31 energized as heretofore described. When the carrier reaches the loading station A, the reset switch 55 is manually depressed, thereby opening the holding circuit for the relay 30, and this relay deenergizes and opens the motor circuit. If at any stage in the cycle of carrier movement it is desired to bring the carrier to rest, the switch 55 is merely manually actuated.

I claim as my invention:

1. Apparatus for testing bottles and the like by thermal shock, which comprises a tank for hot water, a tank for cold water, a pivotally mounted arm having its outer end movable through an arcuate path, in a vertical plane, to points above the tanks, a basket pivotally connected to the said arm end, in position to be moved into the tanks through travel of the arm in said path, and a parallel link device having connection with the basket and maintaining it against swaying during said movements.

2. Apparatus for testing bottles and the like by thermal shock, which comprises a tank for hot water, a tank for cold water, a carrier movable in a vertical plane through a definite arcuate path, means for moving the carrier into a position where articles supported thereby are immersed in one tank, means operating in timed relation thereto for moving the carrier to a position where the articles are immersed in the other tank, and means operating at a timed interval after the last-named movement, for moving the carrier and bringing it to rest at a point removed from the tanks.

3. Apparatus for testing bottles and the like by thermal shock, which comprises a tank for hot water, a tank for cold water, a carrier movable in a vertical plane through a definite arcuate path of approximately 180°, means for moving the carrier into a position where articles supported thereby are immersed in one tank, means operating in timed relation thereto for moving the carrier to a position where the articles are immersed in the other tank, and means operating at a timed interval after the last-named movement, for moving the carrier and bringing it to rest at a point removed from the tanks, the timing being such that the articles are maintained for a longer period in one tank than in the other tank.

4. Apparatus for testing bottles and the like by thermal shock, which comprises a tank for hot water, a tank for cold water, a carrier for the articles to be tested, means for moving the carrier into a position where articles supported thereby are immersed in one tank, means operating in timed relation thereto for moving the carrier to a position where the articles are immersed in the other tank, and means operating at a timed interval after the last-named movement, for moving the carrier to lift the articles out of said other tank and bringing the carrier to rest at a point removed from the tanks, the timing being such that the articles are maintained for a longer period in one tank than in the other tank.

5. Apparatus for testing bottles and the like by thermal shock, which comprises a tank for hot water, a tank for cold water, a carrier, means for causing the carrier to move the articles from a loading station into one tank, thence to the other tank, and thence back to the loading station, and automatically-operable means for so controlling the said movement that the carrier will pass through certain stages of its cycle of movements within a duration of time different from the time consumed by it in passing through other stages of the cycle.

6. Apparatus for testing bottles and the like by thermal shock, which comprises a tank for hot water, a tank for cold water, a carrier, means for causing the carrier to move the articles from a loading station into one tank, thence to the other tank, and thence back to the loading station, and means for bringing the carrier to rest at said loading station, all of said means operating in predetermined timed relation.

7. Apparatus for testing bottles and the like by thermal shock, which comprises a tank for hot water, a tank for cold water, a pivotally mounted arm having its outer end movable through an arcuate path, in a vertical plane, to points above the tanks, a vertically disposed lever extending transversely of said arm and pivotally connected thereto, an article-supporting member carried by the lever, a link disposed parallel to said arm, in laterally spaced relation thereto and pivotally connected to the upper end of the lever and means for pivotally supporting the other end of the link, the lower end of the lever being in proximity to the tanks when the outer end of the said arm is at the extremities of said arcuate path.

FRANK W. PRESTON.